United States Patent [19]

Spence-Bate

[11]  4,062,025

[45]  Dec. 6, 1977

[54] METHOD AND APPARATUS FOR MICROFORM UPDATING

[76] Inventor: Harry Arthur Hele Spence-Bate, 1 Cheam Place, Morley, Australia, 6062

[21] Appl. No.: 685,994

[22] Filed: May 13, 1976

[30] Foreign Application Priority Data

May 15, 1975   Australia .............................. 1613/75

[51] Int. Cl.² ...................... B29C 19/00; B32B 31/00; B60J 1/00; G03B 29/00
[52] U.S. Cl. ..................................... 354/76; 156/108; 156/261; 156/293; 156/303; 156/518; 156/552; 355/29
[58] Field of Search ........................... 354/75, 354, 76; 355/64, 29, 133; 353/120, DIG. 2; 156/108, 293, 261, 303, 518, 552

[56] References Cited

U.S. PATENT DOCUMENTS

| 2,726,187 | 12/1955 | Ringer | 156/108 |
| 2,820,733 | 1/1958 | Sorel | 156/108 X |
| 2,977,017 | 3/1961 | Herzig | 156/108 |
| 3,190,784 | 6/1965 | Heydon et al. | 156/108 X |
| 3,259,037 | 7/1966 | Wilkinson | 354/354 X |

Primary Examiner—John Gonzales
Attorney, Agent, or Firm—Fidelman, Wolffe & Waldron

[57] ABSTRACT

Apparatus and method for updating microform information recorded in a sequence on photographic film emulsion, including taking a desired portion of the emulsion carrying an image and bonding it to a primary base material either in the same sequence but with gaps left in the sequence or in a different sequence. The emulsion is bonded into sunken areas in the base material, the sunken areas either being formed by indented portions in the base material or by applying an apertured frame surrounding a flat base material.

14 Claims, 6 Drawing Figures

METHOD AND APPARATUS FOR MICROFORM UPDATING

The present invention relates to a method and apparatus for microform updating.

An editor has been proposed for microform updating purposes in which a first microfiche or microfilm on which images, normally of documents, are recorded in sequence and the first microfiche or microfilm is then presented to a second microfiche. The editor transfers the images from the first microfiche to the second microfiche in different sequence, or the same sequence but leaving gaps in the sequence for a subsequent transfer of the same or different sequence omitting images recorded on the first microfiche or microfilm. The process of updating can be compared with sorting a file and adding or deleting documents as required to make up a complete updated file. The disadvantage of such an editor is that if frequent resequencing (i.e. sorting) and/or adding or deleting operations are carried out, the number of image transfers multiplies, that is images are continually recopied. Each image transfer implies a deterioration in resolution and thus the final images are deteriorated in proportion to the number of transfers or copying operations one way of overcoming the disadvantage or to store up the document to be copied until a batch could be recorded all together. Clearly such a method reduced the capacity of the system to record safely each document as it was received. It is with this problem in mind that the present invention seeks to produce a system wherein the number of copying operations is kept to a minimum while allowing the maximum number of transfers.

The present invention therefore comprises a method of microform updating in which images are recorded sequentially on a photographic emulsion provided on a permanent carrier material, removing the emulsion or a portion thereof including at least one selected image of the sequence recorded thereon from the sequence and bonding the emulsion to a film base in a new order. The term "new order" means either the same sequence with gaps left in the sequence, different sequence with or without gaps, or the same or different sequence with deletions or additions to the same or different sequence.

The advantage of this present method according to the invention is that images can be recorded as soon as documents for recording are received in the sequence received on the emulsion and the new order selected at a time interval for the recording stage so as to enable a batch of images to be temporarily stored rather than storing a batch of documents. Thus, storage space is saved and only one photographing stage is carried out, thereby no deterioration of the image occurs.

An apparatus for carrying out the method according to the invention comprises a microform camera for recording the sequence of images of a film emulsion, means for moving the film emulsion retained on permanent carrier material in the said sequence, means for removing the emulsion or a portion thereof including at least one selected image of the sequence from the said sequence, means for selecting a new order of the sequence and means for applying the image or images to a film base in a new order.

Preferably, the emulsion used is a wet developed silver halide. Another advantage of the method and apparatus of the invention is that developing of the emulsion can take place either before or after rearrangement of the image or images in the new order.

Preferably, the base material has image frames formed therein as sunken areas and the emulsion is bonded into the sunken areas so as to be flush with the remainder of the base material. In one example of the invention the base material is about 0.008 inches thick, each sunken area is about 0.003 to 0.004 inches deep and the emulsion with permanent carrier material about 0.003 inches thick. Thus, the assembled and bonded base and emulsion is substantially flush.

In one convenient arrangement according to the invention the emulsion and permanent carrier material is temporarily stuck by an adhesive to a temporary carrier base material which is removed from the emulsion and permanent carrier material to expose the adhesive which remains on the emulsion and permanent carrier material. The same adhesive is then used to bond the emulsion and permanent carrier material to the base material. Alternatively the base material may have adhesive applied to the sunken area for bonding the base material to the emulsion and permanent carrier material. In a further embodiment of the invention the sunken areas are formed by using a flat base material on to which an image frame surround layer is applied to the base material. In this arrangement the base material can be about 0.004 inches thick and the frame surround layer is approximately the same thickness as the emulsion and permanent carrier material which is about 0.003 inches thick.

In a further arrangement according to the invention the bonding of the emulsion to the base material is carried out by the application of heat.

The invention will now be described with reference to the accompanying drawings in which.

Figure 1:
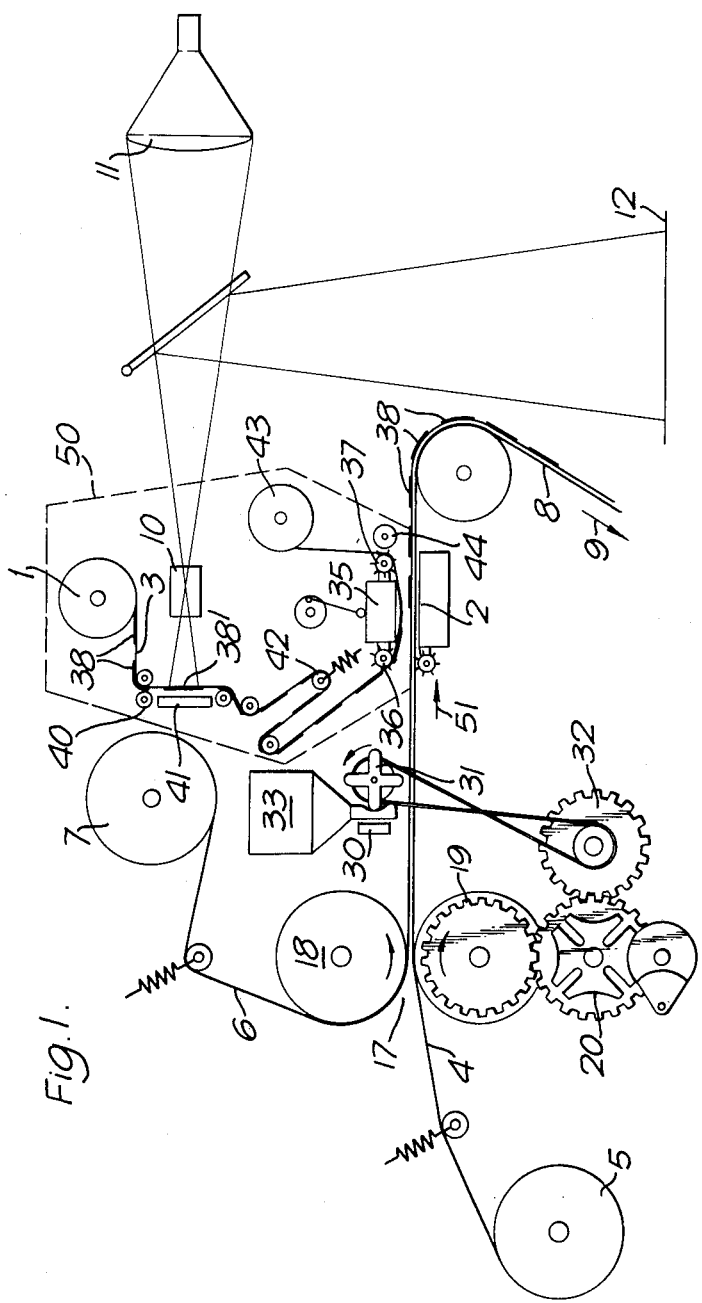
FIG. 1 is an apparatus for microfilm updating in accordance with the invention.

The apparatus shown in FIG. 1 is intended for microfilm updating although with slight modification as will be indicated the apparatus can be used for microfiche updating.

The apparatus of FIG. 1 is based on the basic requirement to feed film from a store 1 to a bonding station 2 where film images recorded on an emulsion and carried on a temporary carrier base 3 are bonded to a base material 4 fed from a store 5. Also bonded to the base material 4 is a frame surround layer 6 fed from a store 7. After bonding at the bonding station 2 the combined emulsion base material and frame surround 8 is fed in a direction 9 to a developing unit. The updating unit in the example shown also includes a recording lens 10 arranged to record either from a cathode ray tube 11 or straight from a document platen 12. Alternatively the updating apparatus need not incorporate any film recording arrangements, since these may be carried out independently by a separate camera.

Figure 2:
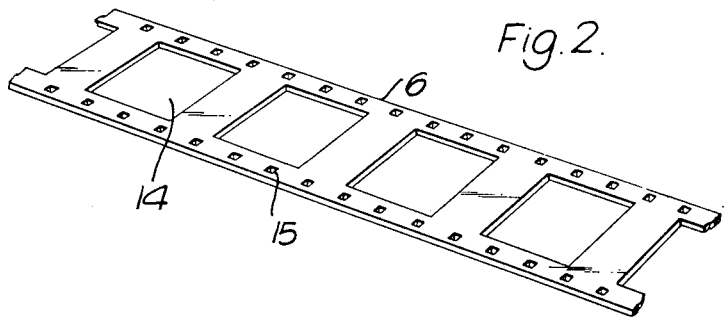
FIG. 2 shows a frame surround layer in accordance with the invention.
Figure 3:
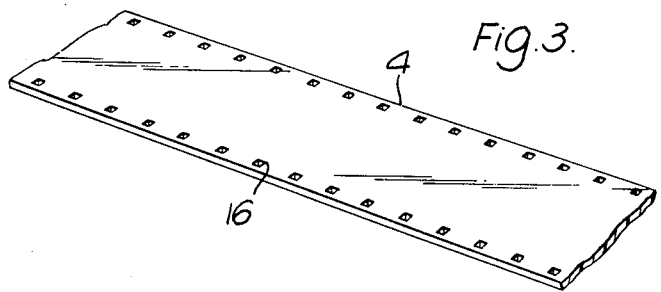
FIG. 3 shows a base material in accordance with the invention.
Figure 4:
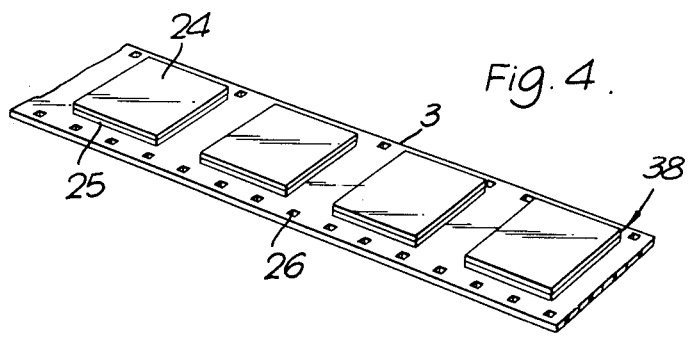
FIG. 4 shows an emulsion bonded to a permanent carrier material and temporarily stuck to a temporary carrier base according to the invention, FIGS. 2 to 4 being components of updatable microfilm for the apparatus in FIG. 1.

The specific film arrangements are shown in FIGS. 2 to 4 where in FIG. 2 there is shown a frame surround layer 6 which is essentially a sprocket strip of film material having frame apertures 14. The layer 6 is lined up by means of the sprocket holes 15 to the base material 4 by means of further sprocket holes 16 in the base material the alignment of the base material 4 and the surround layer 6 is carried out at an alignment station 17 at which there are located two rollers 18 and 19. Roller 19 is fed by a stepping mechanism suitably a Geneva wheel 20. The stepping mechanism is necessary to coordinate other parts of the apparatus. Although it is intended to in the present apparatus to bond a surround layer 6 and base material 4 at a bonding station 2. It is possible that they could be bonded by heat means between the rollers 18 and 19.

The emulsion in a layer 24 is carried on a layer of permanent carrier material 25 which is in turn carried on a temporary carrier base 3. The temporary carrier base again is provided with sprocket holes 26 which are used to align the base material frame surround layer and emulsion together.

After leaving the bonding station 17 the surround layer and base material are fed past and an adhesive applying station 30 at which drops of a suitably adhesive are fed from a supply 33 by means of a metering device 31 synchronised by a suitable drive 32 connected to the Geneva wheel 20, on to the base material within the frame 14 which forms a reservoir for the adhesive.

The base material 4 together with surround layer 6 with adhesive supplied with the adhesive supply store 33 is then passed to the bonding station 2. At the bonding station 2 a reciprocating plunger 35 carrying sprocket rollers 36 and 37 applies emulsion in discrete frames as shown in FIG. 4.

Each emulsion portion 38 comprising the emulsion 24 and permanent carrier material 25 is carried from a store 1 on its temporary carrier base 3 to a photographic recording station 40 where an image either from CRT 11 or document platen 12 is recorded through the lens 10. A platen 41 holds the film flat at the station.

After photographic recording the exposed emulsion portions 38 are passed via a take up roller 42 to sprocket rollers 36 and thence round to the partly convex slightly flexible surface of the plunger 35. The convexity of the plunger surface allows the plunger to press each emulsion portion from the centre outwards to eliminate air pockets forming between the emulsion and carrier base 4. In the event of bonding the frame surround to the carrier base at the bonding station it may be possible to squeeze some of the adhesive used to bond the emulsion portion between the frame surround and carrier base to bond the three components in one operation. After bonding the temporary carrier base 3 is removed to a store 43 having passed between a drive sprocket roller 37 and a keep roller 44 which ensures accurate location of the emulsion portions 38 at the bonding station. The combined assembly of components 38, 4 and 6 pass onwards as a combined undeveloped strip 8 which may be fed to a developer.

Various alternative embodiments of the apparatus and method of making the combined film or strip 8 are envisaged using the basis of the apparatus shown in FIG. 1. For instance, if it is desired to use the apparatus solely as an editing device the recording station 40 can be eliminated and pre-recorded emulsion portions 38 can be fed from the store 1 straight to the bonding station 2. Alternatively, if microfiche editing or recording is required the whole assembly 50 which includes the recording station and plunger 35 can be made to move in an axis parallel to the axis of rotation of the store 1 so as to locate emulsion portions 38 in one axis relative to the bonding station 2 whilst movement of the strip 8 in direction 51 can represent the other necessary movement to locate emulsion portions 38 in the X and Y axis required for microfiche editing.

A further alternative arrangement is proposed whereby instead of bonding the base material 4 to the surround layer 6, the base material has sunken areas already provided in base surfaces. The sunken areas are preferably 0.003 to 0.004 inches deep and the base material about 0.008 inches thick. The emulsion with permanent carrier material is about 0.003 inches thick. This compares with the arrangement shown in FIG. 1 where the base material is about 0.004 inches thick and the frame surround layer is approximately the same thickness as the emulsion and permanent carrier material which is about 0.003 inches thick.

Suitable bonding materials for permanent bonding of surfaces together are optical cements such as Whillens cellulose caprate optical cement grade 20 which has an application temperature of about 100° C or a Canada Balsam manufactured by B.D.H. Chemicals Ltd. of Poole, England. Ideally the cement dissolves the surface of the material to be joined only very slightly.

It will also be appreciated that in the device shown in FIG. 1 various frames can have the application of an emulsion portion 38 omitted so as to leave the record with gaps provided thereon either in microfilm or microfiche use. Subsequently, the microfiche or microfilm can be rerun through the device from the station 17 to the bonding station 2 where the gaps in the record can be filled with updated material. It will also be appreciated that the new order as previously defined can be achieved by programming the application the emulsion portions at the bonding station 2 with respect to the material fed from station 17. Thus, it is possible to rearrange a sequence of images recorded at the recording station 40 and select a particular image along the length of the film between store 1 and store 43 for bonding to the strip 8.

Figure 5:
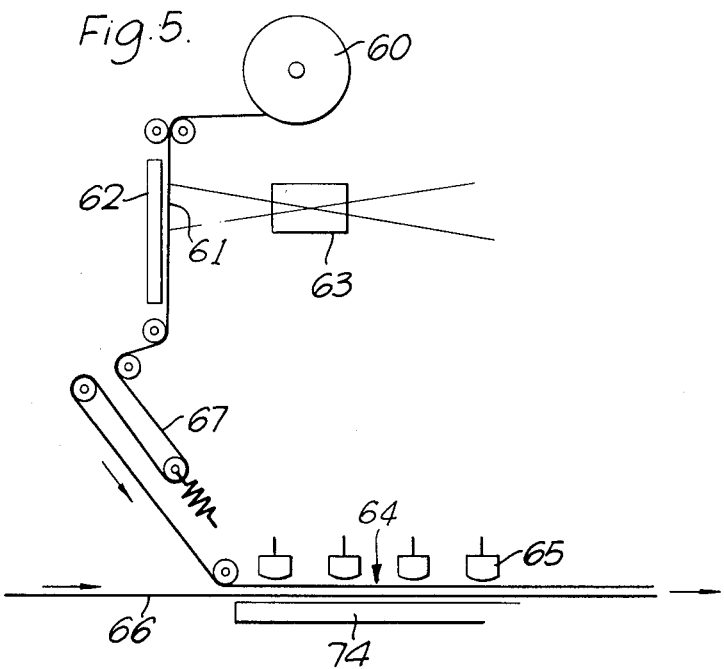
FIG. 5 shows an apparatus according to the invention for microfiche updating.
Figure 6:
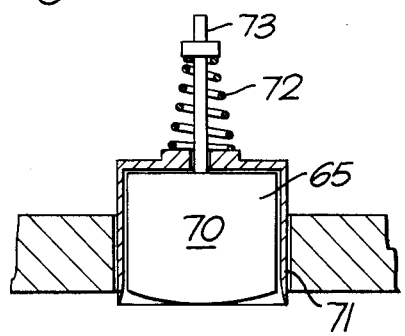
FIG. 6 shows a plunger bonding mechanism for the apparatus shown in FIG. 5.

In a further embodiment of the invention shown in FIG. 5, a sheet of emulsion the width of a microfiche on a carrier base is fed from a store 60 to a recording station 61 where a suction platen 62 holds the emulsion flat and by a suitable X and Y shift mechanism (not shown) images are recorded in rows and columns on the emulsion. The sequence of recording can be either in the sequence presented to the camera lens 63 or a modified sequence in a new order as previously defined. The new order is controlled by a sequence control system (not shown) connected to the X and Y shift mechanism. The emulsion is then fed to a bonding station 64 in line with a plurality of plungers 65 which are shown in further detail in FIG. 6. Depending on how many images are to be applied to the film base 66 a few or many plungers are operated to apply emulsion to the base 66 in the required places. The base material has as previously discussed sunken areas into which the emulsion is bonded. The plungers are advantageously displaced or staggerred in two or more rows with a gap between them or a total blank row to allow sufficient wall thickness between the plungers for mechanical reasons. The emulsion transfer for a complete line is thus preferably made in two steps, e.g. column positions 2, 4, 6, 8, 10, 12 and 11 in the first run and columns 1 to 13 in the second run. Any position or positions can be left clear by not activating the respective plunger. These spaces are used when required at some future date when emulsion is applied to them as previously indicated positions can continually be made until the whole microfiche is filled or a continuation microfiche can be produced. In FIG. 6 one plunger 65 is shown having an internal bonding member 70 and an external cutting member 71 which cuts the emulsion in the shape and size of a desired image. The knife member 71 and bonding member 70 are interconnected by a spring 72 so that when the piston rod 73 forces the bonding member downwards on to the emulsion the knife member 71 is allowed to cut the emulsion but not to damage the platen 74 located below the plungers. The platen 74 is provided with suction means in order to maintain the base material 66 and emulsion material 67 in a perfectly flat situation.

I claim:

1. A method of microform updating comprising the steps of:
    a. recording photographic images in a sequence on photographic emulsion, the emulsion being incorporated in or applied to a layer of permanent carrier material,
    b. temporarily bonding said permanent carrier material to a temporary carrier base material,
    c. feeding said temporary carrier base material carrying said emulsion and permanent carrier material to a transfer station,
    d. selecting one of the images recorded on the emulsion from the sequence at said transfer station,
    e. feeding a strip of primary base material having sunken areas defining image frames formed therein to said transfer station,
    f. removing the emulsion and permanent carrying material containing the one selected image from said temporary carrier base material,
    g. bonding said one image recorded on emulsion to said primary base material in one image frame at said transfer station,
    h. selecting a further one of the images recorded on the emulsion from said sequence at said transfer station,
    i. moving said strip of base material to locate a further said image frame at said transfer station,
    j. bonding said further image in a further said image frame spaced from said one image frame by at least one other said frame or before said one frame relative to said recording sequence, whereby the sequence of images on the resultant combination of emulsion carrier and base is modified from said recording sequence.

2. The method of claim 1 comprising the further step of bonding said emulsion and carrier into said sunken areas so that said emulsion and carrier is flush with the material surrounding the sunken area.

3. A method as claimed in claim 2 wherein said sunken areas are formed by applying an image frame surround layer to the base material, said surround layer comprising a sheet or strip of material having apertures each dimensioned to be the same size as said frame, the perimeter of each said aperture forming the perimeter of each said sunken area, and the thickness of said surround layer conforming to the depth of the sunken area.

4. The method of claim 1 further comprising storing said photographic recorded images in said recording sequence before selecting one of the images from the sequence.

5. The method of claim 1 comprising providing said permanent carrier material with an adhesive, using the adhesive to temporarily bond the permanent carrier material to said temporary carrier base material and bonding said emulsion and permanent carrier material to said primary base material by means of said adhesive.

6. The method of claim 1 comprising bonding said permanent carrier material to said primary base material by the application of heat.

7. The method of claim 1 comprising feeding said primary base material with at least one said image bonding to said primary base material to said transfer station on a second pass so as to apply a further image to said primary base material from a further recording sequence.

8. The method of claim 1 comprising the steps of applying adhesive in at least one of said sunken areas before feeding to said transfer station.

9. The method of claim 1 comprising providing a plurality of plungers in two or more rows at said transfer station, feeding said emulsion carrying two or more rows of said images to the transfer station and transferring at least one of said images carried on said emulsion by means of a said plunger on to said primary base material.

10. Apparatus for microform updating comprising a microform camera for recording a sequence of images on a film emulsion, means for moving said film emulsion retained on permanent carrier material to a transfer station, means for feeding a strip of primary base material to said transfer station and means for applying said film emulsion and permanent carrier material to said primary base material at said transfer station, said means for applying a plunger having an interconnected and surrounding blade, said blade adapted to cut an image-carrying frame from said film emulsion and said plunger being adapted to remove said frame and bond said carrier material to said primary base material.

11. An apparatus of claim 10 comprising means for selecting one of said images for bonding to said primary base material in a sequence differing from the recording sequence.

12. An apparatus of claim 10 comprising means for applying adhesive to either said permanent carrier material or said primary base material.

13. An apparatus of claim 10 wherein said plunger is adapted to press said emulsion and permanent carrier material on to said primary base material.

14. An apparatus of claim 10 further comprising means for feeding a strip of frame surround material to a bonding station and bonding the frame surround material to said primary base material, the frame surround material comprising a strip of material having apertures formed therein, said apertures each conforming in size and shape to said image-carrying frame.

* * * * *